(12) United States Patent
Lee et al.

(10) Patent No.: US 9,189,026 B2
(45) Date of Patent: Nov. 17, 2015

(54) WATERPROOF STRUCTURE

(71) Applicant: GETAC TECHNOLOGY CORPORATION, Hsinchu County (TW)

(72) Inventors: Gwo-Shiang Lee, Hsinchu (TW); Kun-Yu Tsai, Taipei (TW); Ting-Wei Liang, Taoyuan County (TW)

(73) Assignee: Getac Technology Corporation, Hsinchu County (TW)

( * ) Notice: Subject to any disclaimer, the term of this patent is extended or adjusted under 35 U.S.C. 154(b) by 23 days.

(21) Appl. No.: 14/178,185

(22) Filed: Feb. 11, 2014

(65) Prior Publication Data

US 2015/0103478 A1    Apr. 16, 2015

Related U.S. Application Data

(60) Provisional application No. 61/890,752, filed on Oct. 14, 2013.

(51) Int. Cl.
| | |
|---|---|
| *H05K 5/06* | (2006.01) |
| *G06F 1/16* | (2006.01) |
| *H04B 1/3888* | (2015.01) |
| *H04M 1/02* | (2006.01) |
| *H04M 1/18* | (2006.01) |
| *H04B 1/38* | (2015.01) |

(52) U.S. Cl.
CPC ............ *G06F 1/1633* (2013.01); *G06F 1/1601* (2013.01); *H04B 1/3888* (2013.01); *H04M 1/0266* (2013.01); *H04M 1/18* (2013.01); *H04B 2001/3894* (2013.01)

(58) Field of Classification Search
CPC ...... H05K 5/068; G06F 1/1633; G06F 1/1601
USPC ......................................................... 361/679.26
See application file for complete search history.

(56) References Cited

U.S. PATENT DOCUMENTS

| | | | | |
|---|---|---|---|---|
| 6,897,852 | B2 * | 5/2005 | Grosfeld et al. ............... | 345/173 |
| 8,068,331 | B2 * | 11/2011 | Sauers .................. | G06F 1/1626 206/305 |
| 2007/0171603 | A1 * | 7/2007 | Yang .................... | H04M 1/0202 361/679.01 |
| 2012/0075809 | A1 * | 3/2012 | Chen ...................... | G06F 1/1626 361/724 |
| 2013/0242481 | A1 * | 9/2013 | Kim ........................ | H05K 5/06 361/679.01 |

FOREIGN PATENT DOCUMENTS

WO    WO 2009/064253 A2    5/2009

* cited by examiner

*Primary Examiner* — Tuan T Dinh
*Assistant Examiner* — Rockshana Chowdhury

(57) ABSTRACT

A waterproof structure including a housing, a display element assembled to the housing, and a sealing member is provided. The housing has a frame and an opening located on a plane. A portion of the display element is exposed out of the opening. The sealing member disposed between the housing and the display element has a first portion extending toward the opening from the frame and parallel to the plane and a second portion squeezed by the housing and the display element. A first end of the second portion next to the opening leans against the housing, and a second end of the second portion far away from the opening leans against the display element. A gap along a direction between the first portion and the display element is equal to or greater than deformation of the second portion along the direction, wherein the direction is orthogonal to the plane.

10 Claims, 7 Drawing Sheets

US 9,189,026 B2

WATERPROOF STRUCTURE

BACKGROUND OF THE INVENTION

1. Field of the Invention

The present invention generally relates to a waterproof structure of an electronic device.

2. Description of Related Art

Recently, touch panels have been applied in many electronic devices, such as mobile phones, laptops, MP3, personal digital assistants (PDA), global positioning system (GPS), super mini computers (UMPC) and other portable electronic devices. The technology of touch panel on the market can be commonly divided into restive one, capacitive one, infrared one and ultrasound one. So far, the resistive and the capacitive touch panels play the main role on the market.

If the aforementioned electronic device is used in a more harsh environment, such as waterproof function, sand-proof function, corrosion-resistant function and anti-vibration function, etc., the electronic device requires some additional designs to meet the relevant usage needs, for example, to reach a required waterproof grade and anti-vibration.

In other words, to meet the usage needs, the aforementioned electronic device must meet the more strict design specifications. Taking the waterproof effect as an example, in general, an electronic device with a touch screen mostly employs waterproof tapes disposed between the housing and touch screen thereof, and the sealing effect between the touch screen and the housing is achieved by squeezing the waterproof tapes during assembling. However, the employing of the waterproof tape is necessary for an electronic device with a resistive touch screen, but the waterproof tape in the assembling process would cause some relevant troubles.

For example, FIGS. 1 and 2 are local cross-sectional diagrams of an electronic device in the current technology, and FIGS. 3 and 4 show the states of the touch screen of the electronic device after being assembled in current technology respectively corresponding to FIGS. 1 and 2. Referring to FIGS. 1-4, a display element 120 of an electronic device 300 is a resistive touch screen which performs induction operation through a voltage-detecting method, wherein indium tin oxide (ITO) conductive glass 121 and PET (polyethylene terephthalate, briefly referred to as polyester or PET) conductive film 123 are the main raw materials of the display element 120. In addition, a plurality of spacers 121a are disposed between the upper transparent electrode and the lower transparent electrode to maintain a gap between the PET conductive film 123 and the conductive glass 121, while an adherent element 125 (for example, adhesive) located at both sides of the spacers 121a is adhered between the conductive glass 121 and the PET conductive film 123. When a finger, a stylus or other objects exerts a force onto the PET conductive film 123, the value of the capacitance between the PET conductive film 123 and the conductive glass 121 gets changed. However, during the assembling, when a fastener 140 is assembled to the housing 310, the fastener 140 clamps the display element 120 and a sealing member 330 (i.e., the aforementioned waterproof tape) therein such that the sealing member 330 gets deformed due to the squeezing action (as shown in FIG. 2). Further, the PET conductive film 123 is squeezed under the deformation of the sealing member 330 (as shown in an arrow head in FIG. 2) to push the PET conductive film 123 into a state shown in FIG. 4, i.e., both ends of the PET conductive film 123 are bulged and the portion between the both ends is collapsed.

Thus, the conductive glass 121 and the PET conductive film 123 after the electronic device 300 being assembled are quite close to each other, and further the upper electrode may be conductive with the lower electrode.

FIG. 5 is a schematic diagram of a touch screen in bad state. It can be seen from FIG. 5 that while a user normally touch manipulates onto a display surface 122 (for example, writing a "止" Chinese character on the display surface 122), due to short-circuit between the upper and lower electrodes, the touch coordinates are disordered, and further fly-line happened as shown in FIG. 5.

Therefore, an issue for the relevant developers to care about is that how the touch function is normally performed of the electronic device 300 under the aforementioned circumstance.

SUMMARY OF THE INVENTION

Accordingly, the present invention is directed to a waterproof structure with waterproof function and touch efficiency of the display element after assembling.

A waterproof structure of the invention includes a housing, a display element and a sealing member. The housing has a frame, and an opening on a plane is defined by the frame. The display element is assembled to the housing, in which a portion of the display element is exposed by the opening of the housing. The sealing member is disposed between the housing and the display element, in which the sealing member has a first portion and a second portion, the first portion extends towards the opening parallel to the plane from the frame of the housing, a first end of the second portion leans against the housing and is adjacent to the opening, and a second end of the second portion leans against the display element and is far away from the opening. When the display element is assembled to the housing, the second portion is squeezed by the housing and the display element, and a gap in a direction of the first portion relative to the display element is greater than or equal to the deformation amount in the direction of the second portion, in which the direction is a normal direction of the plane.

In an embodiment of the present invention, there exists a first space between the first portion and display element, the second end is located between the first space and the opening; when the second portion is squeezed by the housing and the display element, the second end moves towards the first space.

In an embodiment of the present invention, a dimension in the direction of the first space is greater than or equal to a deformation in the direction of the second portion.

In an embodiment of the present invention, a volume of the first space is greater than or equal to a volume deformation of the second portion.

In an embodiment of the present invention, when the second portion is squeezed by the housing and the display element, the second end moves towards the first space and is folded to the first portion.

In an embodiment of the present invention, the display element has a thin film leaning against the second end, when the second portion is squeezed by the housing and the display element, the second end forces the thin film to move towards the frame.

In an embodiment of the present invention, there exists a second space between the first portion and the frame, the first end is located between the second space and the opening, and the first end moves towards the opening when the second portion is squeezed by the housing and the display element.

In an embodiment of the present invention, a sum of dimension in the direction of the first space and dimension in the direction of the second space is greater than or equal to the deformation in the direction of the second portion.

In an embodiment of the present invention, a sum of volumes of the first space and the second space is greater than or equal to a volume deformation of the second portion.

In an embodiment of the present invention, a connection line is formed between the first end and the second end, and angle is included between the connection line and the direction, and the angle is between 0° to 90°.

Based on the depiction above, in the aforementioned embodiments of the invention, the second portion of the sealing member which together with the housing and the display element makes up the waterproof structure in an electronic device is in an inclined state towards the opening of the housing, which makes the first end of the sealing member lean against the housing and adjacent to the opening, and makes the second end lean against the display element but far away from the opening. Thus, the display element and the housing of the waterproof structure squeeze the sealing member to make the second end move towards the frame and the first end move towards the opening while the electronic device being assembled, wherein a gap between the first portion and the display element is greater than or equal to a deformation of the second portion, such that the second end is able to be smoothly accommodated in the space between the first portion and the display element. Accordingly, the sealing member exerts a force onto the thin film of the display element to move away from the opening due to the deformation, which enables the thin film stretched towards the periphery thereof and get flattened so as to prevent the thin film deformed towards the center thereof. As a result, it can avoid the capacitance between the PET conductive film and the conductive glass being increased to cause short-circuit phenomenon.

In order to make the features and advantages of the present invention more comprehensible, the present invention is further described in detail in the following with reference to the embodiments and the accompanying drawings.

DESCRIPTION OF THE EMBODIMENTS

Figure 6:
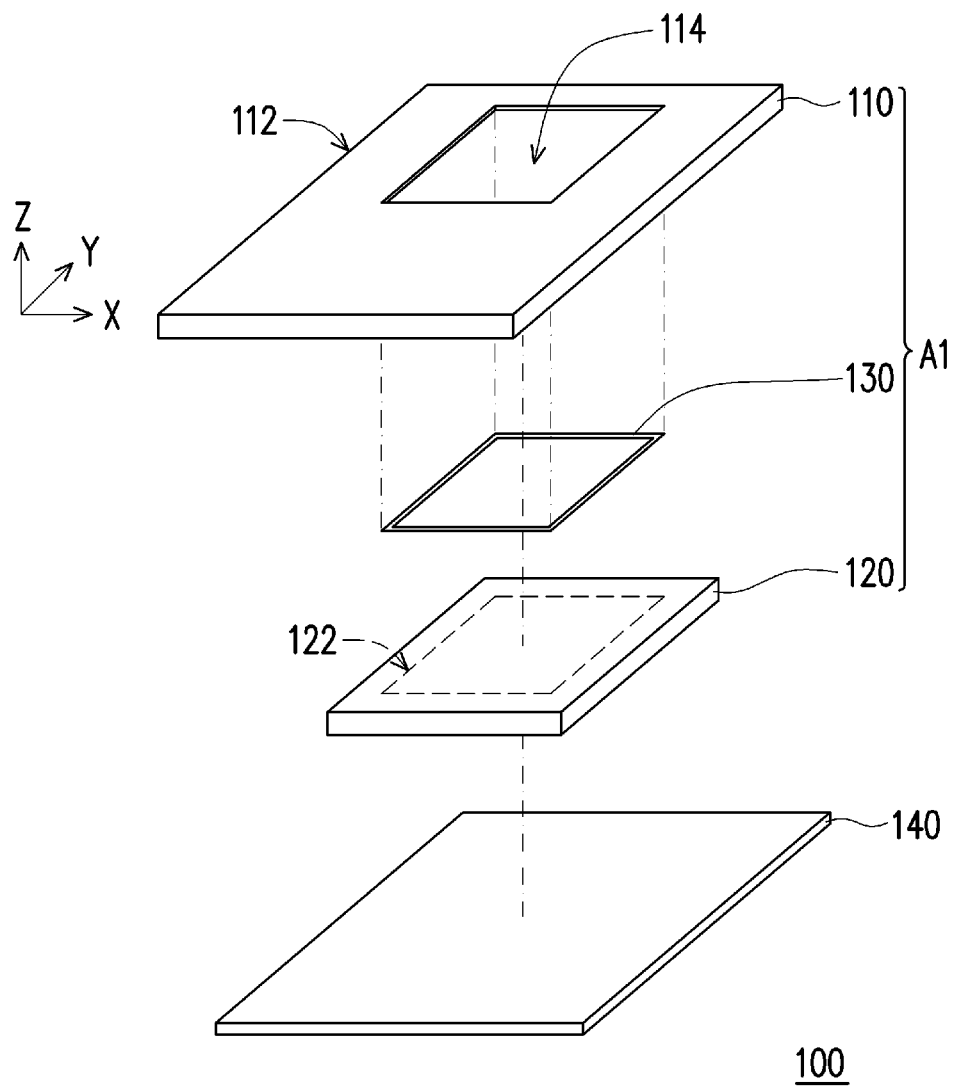
FIG. 6 is an assembling diagram of partial parts of an electronic device according to an embodiment of the invention.
Figure 7:
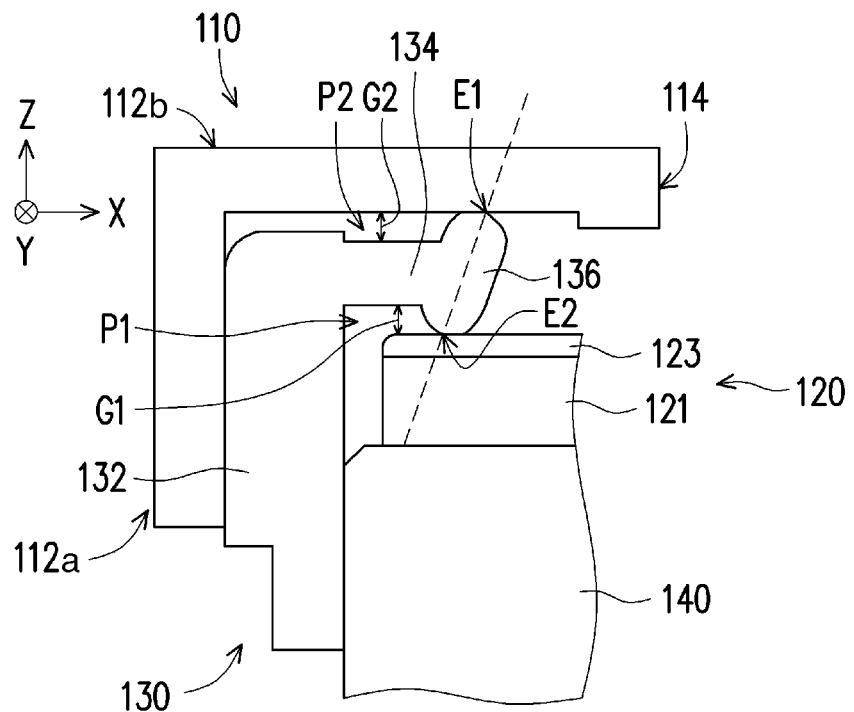
FIGS. 7 and 8 respectively show the local cross-sectional views of the electronic device in FIG. 6.
Figure 8:
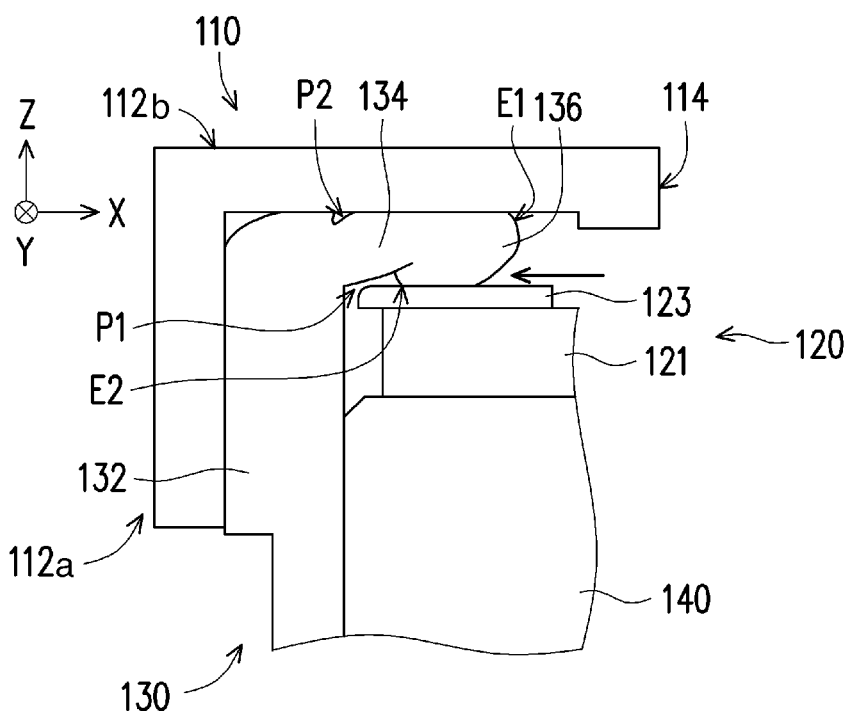

FIG. 6 is an assembling diagram of partial parts of an electronic device according to an embodiment of the invention. FIGS. 7 and 8 respectively show the local cross-sectional views of the electronic device in FIG. 6, in which two different states of the relevant parts are shown before and after the assembling. An orthogonal coordination system is also provided in FIGS. 6 to 8 for better description. Referring to FIGS. 6 to 8, in the embodiment, an electronic device 100 includes a housing 110, a display element 120, a sealing member 130 and a fastener 140. The electronic device 100, for example, is a handheld device such as a notebook computer, a PDA or a mobile phone, but which is not limited in the embodiment. The housing 110 of the electronic device 100 has a frame 112 having a side wall 112a and an upper wall 112b, and an opening 114 located on the X-Y plane is defined by the upper wall 112b of the frame 112. After the display element 120, for example, a touch screen, is assembled to the electronic device 100, the display surface 122 is exposed at the position of the opening 114 of the housing 110 to facilitate the user for operating the electronic device 100.

In more details, the electronic device 100 in the embodiment is a rugged handheld device suitable for using in a relatively-harsh environment to withstand high temperature, high humidity, high vibration etc. Thus waterproof, sand-proof, heatproof, cold-proof, drop-proof, anti-pressure are the basic requirement specifications thereof. Taking the waterproof effect as an example, the embodiment requires a waterproof structure A1 of the electronic device 100 formed by assembling the housing 110, the display element 120 and the sealing member 130 so as to normally operate the electronic device 100 under the aforementioned environment conditions. Specifically, the electronic device 100 of the embodiment employs a sealing member 130 made of, for example, rubber, and the sealing member 130, is disposed between the housing 110 and the display element 120, followed by being assembled in a positive Z-axis direction to the housing 110 through the fastener 140.

Then, referring to FIGS. 7 and 8, respectively showing the local cross-sectional views of the electronic device in FIG. 6. Since the fastener 140 squeezes the sealing member 130 in the positive Z-axis direction, the squeezed sealing member 130 can separate the inside space of the housing 110 from the outer environment thereof to prevent dust or water to seep into the housing 110 through the opening 114.

Figure 9:
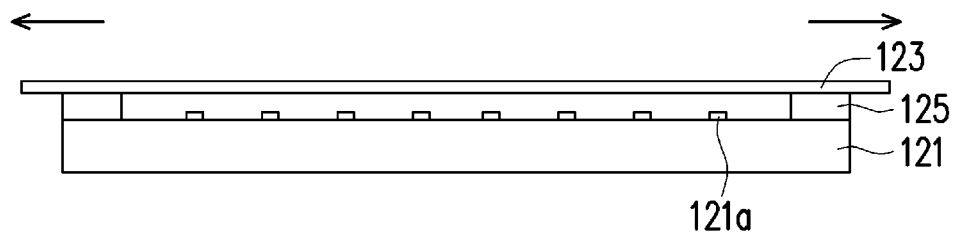
FIG. 9 is a local diagram of the display element in the embodiment after being assembled.

FIG. 9 is a local diagram of the display element in the embodiment after being assembled. In order to achieve the waterproof effect and so on, the sealing member 130 (such as a rubber) of the electronic device 100 needs to lean against between the display element 120 and the housing 110 and withstands the squeezing of the display element 120 and the housing 110. As shown in FIGS. 7 and 8, the sealing member 130 is substantially squeezed between the PET conductive film 123 of the display element 120 and the frame 112. Since the PET conductive film 123 is flexible, the PET conductive film 123 would be pushed by the sealing member 130 as well while being continuously squeezed.

Figure 1:
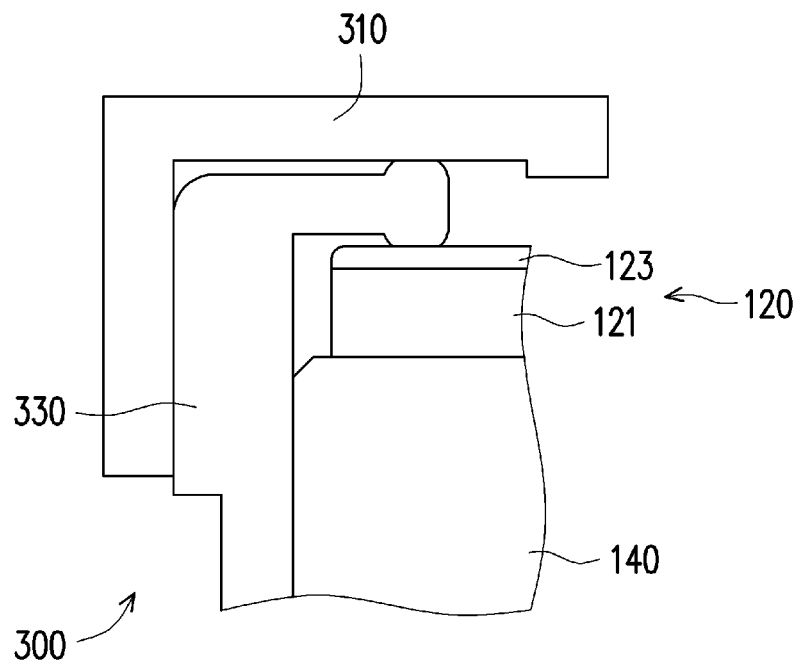
FIGS. 1 and 2 are local cross-sectional diagrams of an electronic device in the current technology.
Figure 2:
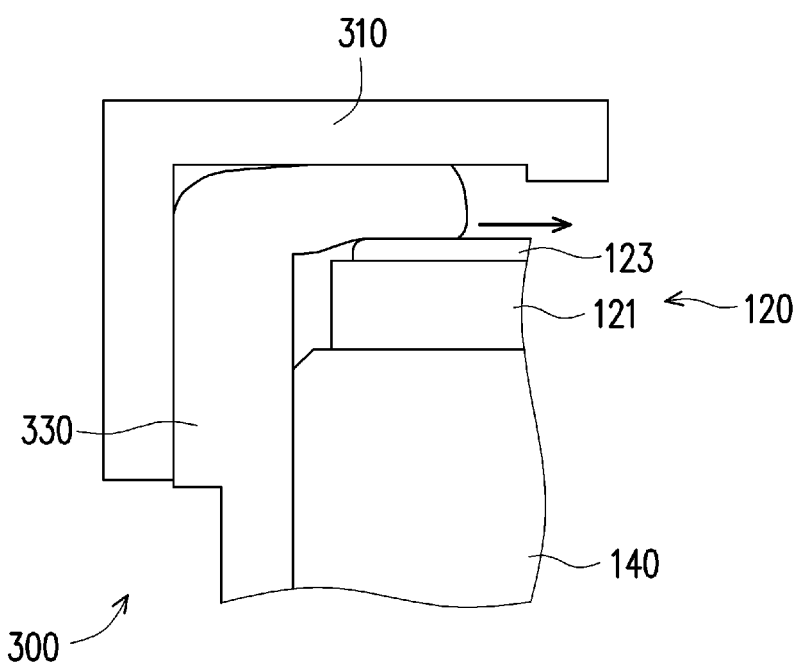
Figure 4:
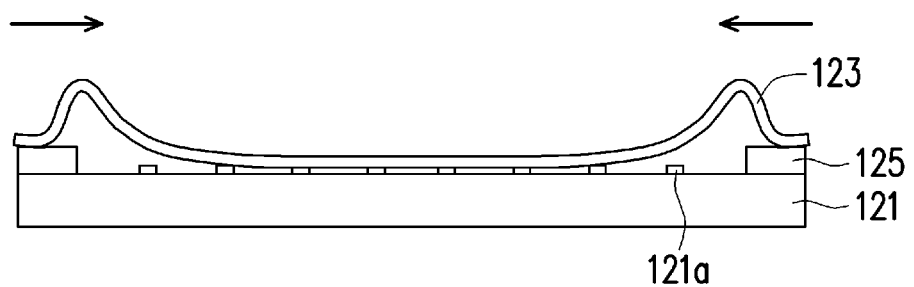
Figure 5:
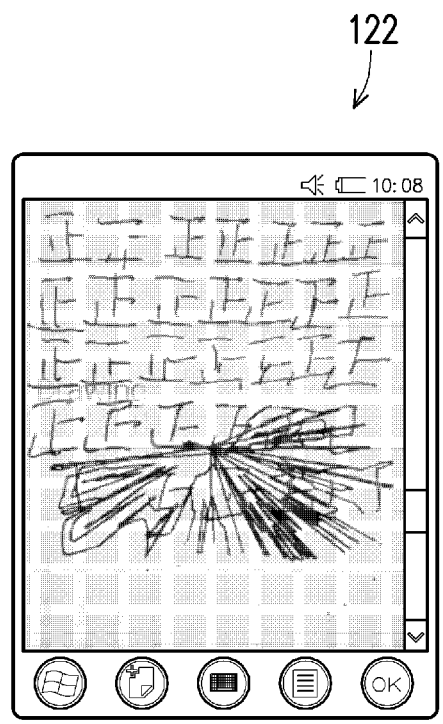
FIG. 5 is a schematic diagram of a touch screen in bad state.

During the assembling process, the sealing member 130 exerts a pushing force onto the PET conductive film 123 of the display element 120 to move the PET conductive film 123 with a displacement (as shown in FIG. 2). To avoid the PET conductive film 123 from the pushing by the sealing member 130 (as shown in FIG. 4) to make the both ends of the PET conductive film 123 budged and the portion between the both ends thereof collapsed, the relevant structure needs to be modified, so that the PET conductive film 123 receives a flattened force by the sealing member 130 as shown by the arrow head in FIG. 9 to make the PET conductive film 123 move far away from the center place of the film 123 after being acted and avoid the deformation towards the middle place. Referring to FIGS. 7 and 8, in the embodiment, the sealing member 130 has a base 132, a first portion 134 extending from the base 132, and a second portion 136 extending from the first portion 134, wherein the base 132 is clamped between the frame 112 and the side-face of the fastener 140. The first portion 134 extends in the way parallel to the X-Y plane towards the opening 114 from the frame 112 of the housing 110.

It should be noted that the first end E1 of the second portion 136 leans against the housing 110 and is adjacent to the opening 114, while the second end E2 of the second portion 136 leans against the PET conductive film 123 of the display element 120 and is far away from the opening 114 relatively to the first end E1. Thus, the second portion 136 of the sealing member 130 prior to be assembled appears in an inclined state of upper right-lower left, i.e., the connection line between the first end E1 and the second end E2 (the dotted line section in orientation of upper right-lower left) has an included angle towards the Z-axis, and the included angle is substantially between 0° to 90°. Then, after the fastener 140 is assembled to the housing 110, the second portion 136 of the sealing member 130 is squeezed between the display element 120 and the housing 110. The flattened force shown by the arrow head of FIG. 9 will be exerted onto the PET conductive film 123 of the display element 120 during assembling due to the aforementioned structure feature of the second portion 136, (the flattened force is corresponding to the pushing action shown in FIG. 4).

Furthermore, in order to ensure a sufficient space existing when the second portion 136 in inclined orientation towards the opening 114 is squeezed, in this embodiment, the gap G1 along the Z-axis direction between the first portion 134 and the display element 120 is greater than or equal to the deformation of the second portion 136 along the Z-axis direction. Specifically, referring to FIGS. 7 and 8, for the second portion 136 of the sealing member 130, the first end E1 is more adjacent to the opening 114, while the second end E2 is more far away from the opening 114, so that when the fastener 140 is assembled to the housing 110, the fastener 140 and the housing 110 respectively squeeze the second portion 136 of the sealing member 130 along the Z-axis direction, which further causes the first end E1 deformed towards the opening 114 (in the positive X-axis direction) and the second end E2 deformed towards the frame 112 (in the negative X-axis direction).

Referring to FIG. 8 again, a space P1 is required between the first portion 134 and the PET conductive film 123, so that the second end E2 between the space P1 and the opening 114 is allowed to be deformed therein. In other words, a dimension of the space P1 in the Z-axis direction should be greater than or equal to the deformation of the second portion 136 in the Z-axis direction, i.e., a volume of the space P1 should be greater than or equal to a volume deformation of the second portion 136. In this way, when the second end E2 is deformed under an external force, the second end E2 fills the space P1. On the contrary, if there is no the space P1 or the size thereof is insufficient to accommodate the deformed second end E2, the second end E2 is deformed only towards the opening 114, which makes the second end E2 exert a force to the PET conductive film 123 to be pushed towards the middle portion thereof and the aforementioned problem in the prior art happens.

Back to FIG. 7, only that the first portion 134 of the sealing member 130 forms a neck-shrinking structure relatively to the second portion 136, the second end E2 can be deformed far away from the opening 114. Also, the force for the second end E2 to exert onto the PET conductive film 123 becomes the flattening force towards the frame 112, the PET conductive film 123 with flexibility under the flattening force can move towards the frame 112.

On the other hand, there is another space P2 between the first portion 134 and the frame 112, where the first end E1 is located between the space P2 and the opening 114. When the second portion 136 is squeezed by the housing 110 and the display element 120, the first end E1 moves towards the opening 114. In this embodiment, a sum of dimension of the first space P1 in the Z-axis direction (i.e., the gap G1) and dimension of the second space P2 in the Z-axis direction (i.e., the gap G2) is greater than or equal to the deformation of the second portion 136 in the Z-axis direction. Alternatively, a sum of volumes of the first space P1 and the second space P2 is greater than or equal to a volume deformation of the second portion 136. In other words, the space P2 between the first portion 134 in a neck-shrinking structure and the top-portion of the frame 112 is still required to serve as a space which accommodates the first portion 134 deformed by itself or serve as the accommodating space for the first portion 134 getting deformation under the pushing by the deformed second portion 136. In this way, it is ensured that the deformation of the first portion 134 would not affect the deformation direction of the second portion 136, and further it can avoid the second end E2 of the second portion 136 being deformed towards the opening 114 under the deformation of the first portion 134.

By comparing the capacitance difference between FIGS. 4 and 9, wherein FIG. 4 represents the prior art after assembling and FIG. 9 represents the invention after assembling. From the capacitance formula in traditional electronics of $$C = \frac{\varepsilon A}{d},$$

wherein C is the capacitance, $\varepsilon$ is the permittivity of the medium, A is the area of a guide plate, and d is the distance between the two guide plates, obtains a result that the smaller the distance between the two guide plates is, the greater the capacitance C is.

Figure 3:
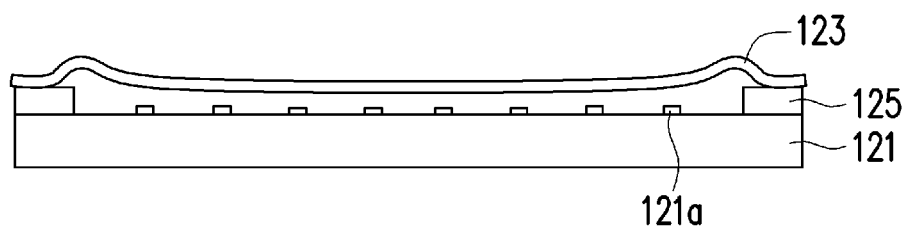
FIGS. 3 and 4 show the states of the touch screen of the electronic device after being assembled in current technology respectively corresponding to FIGS. 1 and 2

When the assembling of the display element 120 shown in FIG. 2 is adopted, the value of the capacitance between the PET conductive film 123 and the conductive glass 121 is 1.8 nF (nano farad), before assembling (as shown in FIG. 3); and the value of the capacitance is 4.5 nF, after assembling. When the assembling of the present invention shown in FIGS. 7-9 are adopted, the value of the capacitance between the PET conductive film 123 and the conductive glass 121 is 2.6 nF, after assembling. It can be seen that the flattening force of the sealing member 130 exerting onto the PET conductive film 123 during the assembling can reduce the collapsed extent of the conventional PET conductive film 123 and the improving efficiency reaches 70.4%, i.e., (4.5 nF−2.6 nF)/(4.5 nF−1.8 nF)=70.4% with adopting the design of the invention.

Figure 10:
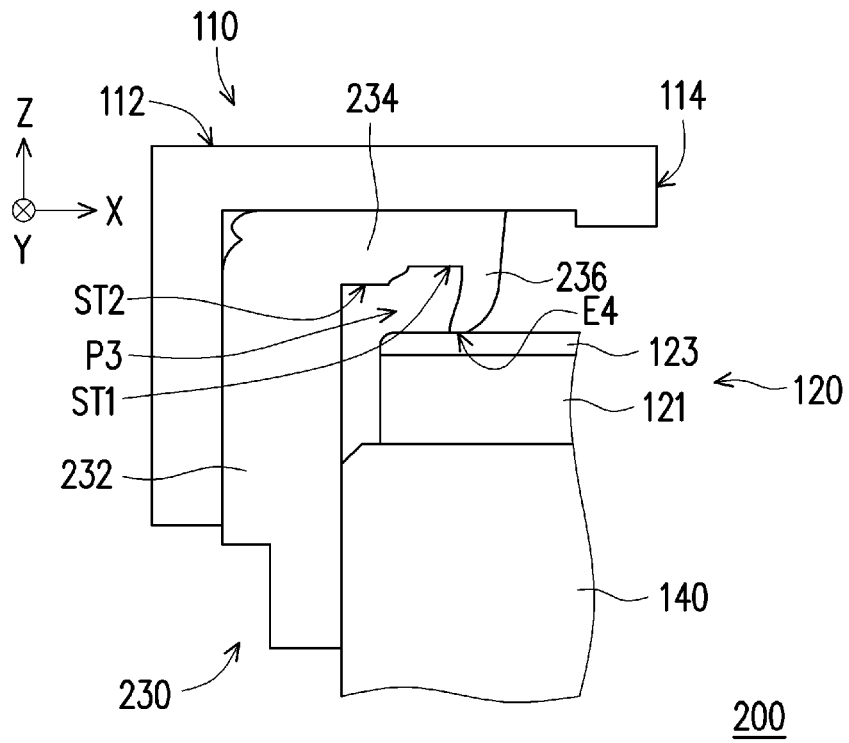
FIG. 10 is a local cross-sectional view of an electronic device before being assembled according to another embodiment of the invention.
Figure 11:
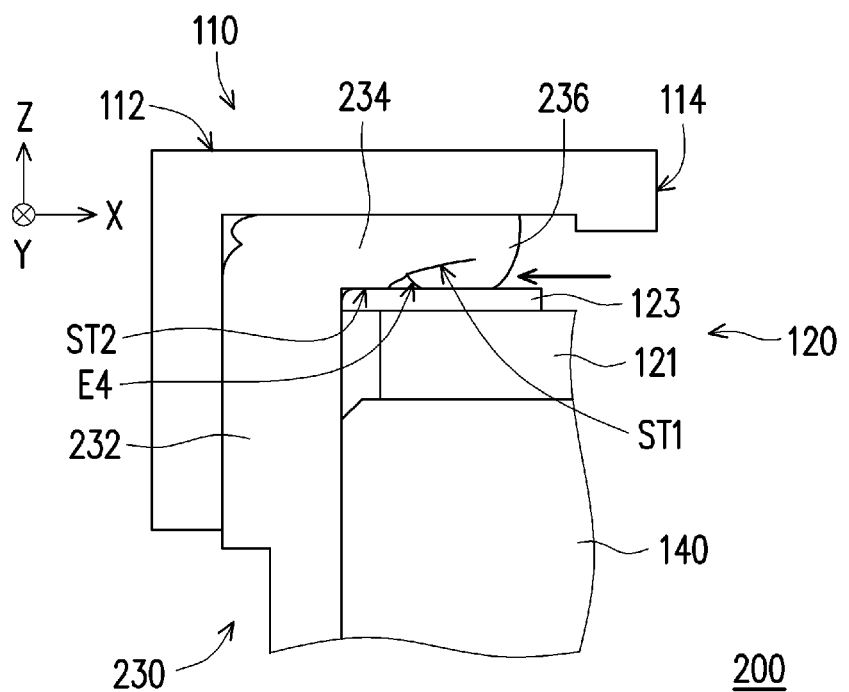
FIG. 11 is a local cross-sectional diagram of the electronic device in FIG. 10 after being assembled.

FIG. 10 is a local cross-sectional view of an electronic device before being assembled according to another embodiment of the invention. FIG. 11 is a local cross-sectional diagram of the electronic device in FIG. 10 after being assembled. Referring to FIGS. 10 and 11, the sealing member 230 serving as one part of the waterproof structure is similar to the sealing member 130 in the aforementioned embodiment. Also, The sealing member 230 has a base 232, a first portion 234 and a second portion 236, whose layouts are the same as the aforementioned embodiment, and there is also a space P3 similar to the space P1 between the first portion 234 and the display element 120.

The unique from the above-mentioned embodiment rests in that there is no the aforementioned space P2 between the first portion 234 and the frame 112 based on the following design consideration. The volume of the space P3 in the embodiment is far greater than the deformation of the second end E2 (but still greater than the space P1), the section of the first portion 234 located at the space P3 has another step structure, so that the second end E2 thereof is able to move towards the space P3 and is folded to the first portion 234 during squeezing the second portion 236. In more details, the second end E2 folded to the first portion 234 can be accommodated in one of the step structures, ST1, and the folded second end E2 and the other step ST2 are substantially located on the same plane.

As shown in FIG. 11, for the folded second end E4, the surface thereof back to the first portion 234 and the other step ST2 simultaneously lean against on the PET conductive film 123 of the display element 120. Accordingly, in this embodiment, the PET conductive film 123 of the display element 120 can be driven to move towards the frame 112 (i.e., the negative x-axis direction).

In summary, in the aforementioned embodiments of the invention, the second portion of the sealing member which together with the housing and the display element makes up the waterproof structure in an electronic device is in an inclined state towards the opening of the housing. Thus, the second end of the second portion leaning against the PET conductive film of the display element exerts an external force to drive the PET conductive film flattened and stretched during squeezing the sealing member while the housing and the display element being assembled. Therefore, in addition to waterproof effect, the normal function of the electronic device is also not affected due to the assembling process. In other words, in addition to that the second portion in the inclined state leans against between the frame and the display element, there is a space between the first portion and the frame and the display element, such that the squeezed second end is deformed towards the frame and drives the PET conductive film to move far away from the opening. It can effectively avoid the sealing member from exerting an external force to the PET conductive film leading the squeezing towards the middle position thereof. As a result, it can avoid the value of the capacitance between the PET conductive film and the conductive glass increased or the short-circuit phenomenon.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention. In view of the foregoing, the protective scope of the present invention is given by the following claims and their equivalents.

What is claimed is:

1. A waterproof structure, comprising:
    a housing comprising a frame, the frame having a side wall and an upper wall, wherein an opening on a plane is defined by the upper wall of the frame;
    a display element, assembled to the housing, wherein a portion of the display element is exposed by the opening; and
    a sealing member comprising a base, a first portion and a second portion, wherein the base comprises a lateral wall encircling a side wall of the display element, and wherein in an uncompressed state, the first portion extends inwardly in a first direction from a top of the lateral wall to a middle of the second portion, the second portion extends in a second direction at an angle transverse to the first direction and has a first end above the first portion leaning away from the base and a second end below the first portion leaning towards the base;
    wherein the sealing member is compressed between the housing and the display element, such that the base is squeezed between the side wall of the frame and the side wall of the display element, the first portion extends over the display element towards the opening in the first direction parallel to the plane, the first end of the second portion is squeezed against the upper wall of the frame, and the second end of the second portion is squeezed against the display element such that a contact between the upper wall of the frame and the first end of the second portion is closer to the opening in the first direction than a contact of the second end of the second portion and the display element, and a gap between the first portion and the display element in a third direction is greater than or equal to a deformation of the second portion in the third direction, wherein the third direction is a normal direction of the plane.

2. The waterproof structure as claimed in claim 1, wherein there exists a first space between the first portion and the display element, the second end is located between the first space and the opening;
    wherein when the second portion is squeezed by the housing and the display element, the second end moves towards the first space.

3. The waterproof structure as claimed in claim 2, wherein a dimension of the first space in the third direction is greater than or equal to a deformation of the second portion the third direction.

4. The waterproof structure as claimed in claim 2, wherein a volume of the first space is greater than or equal to a volume deformation of the second portion.

5. The waterproof structure as claimed in claim 2, wherein when the second portion is squeezed by the housing and the display element, the second end moves towards the first space and is folded to the first portion.

6. The waterproof structure as claimed in claim 2, wherein the display element has a thin film leaning against the second end, when the second portion is squeezed by the housing and the display element, the second end forces the thin film to move towards the frame.

7. The waterproof structure as claimed in claim 2, wherein there exists a second space between the first portion and the frame, the first end is located between the second space and the opening; when the second portion is squeezed by the housing and the display element, the first end moves towards the opening.

8. The waterproof structure as claimed in claim 7, wherein a sum of dimension of the first space the third direction and dimension of the second space the third direction is greater than or equal to the deformation of the second portion the third direction.

9. The waterproof structure as claimed in claim 7, wherein a sum of volumes of the first space and the second space is greater than or equal to a volume deformation of the second portion.

10. The waterproof structure as claimed in claim 1, wherein a connection line is formed between the first end and the second end, an angle is included between the connection line and the third direction, and the angle is between 0° to 90°.

* * * * *